(12) United States Patent
Lille

(10) Patent No.: US 7,007,374 B2
(45) Date of Patent: Mar. 7, 2006

(54) METHOD OF MAKING A MAGNETIC HEAD

(75) Inventor: Jeffrey Scott Lille, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 502 days.

(21) Appl. No.: 10/215,603

(22) Filed: Aug. 9, 2002

(65) Prior Publication Data

US 2004/0027730 A1 Feb. 12, 2004

(51) Int. Cl.
*G11B 5/127* (2006.01)
*H04R 31/00* (2006.01)

(52) U.S. Cl. ............... 29/603.16; 29/603.07; 29/603.11; 29/603.13; 29/603.14; 29/603.15; 29/603.18; 204/192.32; 204/192.33; 204/192.35; 216/62; 216/63; 216/66; 360/324.12; 360/327.32; 451/4; 451/51; 427/127; 427/128

(58) Field of Classification Search ............... 451/4, 451/51; 427/127, 128; 360/322–327; 204/192.32, 204/192.33, 192, 192.35; 29/603.13–603.16, 29/603.11, 603.07, 605, 606; 216/62, 63, 216/66

See application file for complete search history.

(56) References Cited

U.S. PATENT DOCUMENTS

| | | | | |
|---|---|---|---|---|
| 5,018,037 A | * | 5/1991 | Krounbi et al. | 360/327.31 |
| 5,664,316 A | * | 9/1997 | Chen et al. | 29/603.08 |
| 6,185,078 B1 | * | 2/2001 | Lin et al. | 360/324.12 |
| 6,195,239 B1 | | 2/2001 | Araki et al. | |
| 6,266,218 B1 | | 7/2001 | Carey et al. | |
| 6,268,985 B1 | | 7/2001 | Pinarbasi | |
| 6,449,135 B1 | * | 9/2002 | Ding et al. | 360/327.31 |
| 2001/0001256 A1 | | 5/2001 | Hsiao | |
| 2001/0026424 A1 | | 10/2001 | Kamata et al. | |

FOREIGN PATENT DOCUMENTS

| | | |
|---|---|---|
| JP | 9282617 | 10/1997 |
| JP | 10313138 A | 11/1998 |
| JP | 11238211 A * | 8/1999 |

OTHER PUBLICATIONS

"Submicron trackwidth and stripe height MR sensor test structures"; Fontana, R.E., Jr.; MacDonald, S.A.; Ching Tsang; Tsann Lin; Magnetics, IEEE Transactions on Vol. 32, Issue 5, Sep. 1996 Page(s):3440-3442.*

* cited by examiner

*Primary Examiner*—A. Dexter Tugbang
*Assistant Examiner*—Paul D. Kim
(74) *Attorney, Agent, or Firm*—John J. Oskorep, Esq.

(57) ABSTRACT

A narrow track width read sensor having a high magnetoresistive sensitivity is made using a self-aligned process which requires the use of only a single resist mask. A plurality of sensor layers is deposited over a substrate. After forming a resist mask in the central region, first lead layers are deposited in the end regions and over the resist mask. Using the resist mask, ion milling is performed such that the first lead layers and sensor layers in the end regions are substantially removed but sensor layers in the central region remain, to thereby form a read sensor having lead overlays on the edges thereof. Hard bias and second lead layers are then deposited in the end regions and over the resist mask. After the resist mask is removed, the top of the read sensor may be oxidized through an exposure to oxygen plasma.

29 Claims, 8 Drawing Sheets

DEPOSIT SENSOR LAYERS

OPTIONALLY DEPOSIT PROTECTIVE BARRIER LAYER

FORM RESIST MASK

OPTIONAL ETCH (RIE OR SPUTTER)

_US 7,007,374 B2_

METHOD OF MAKING A MAGNETIC HEAD

BACKGROUND OF THE INVENTION

1. Field of the Invention

The present invention relates generally to magnetic heads and methods of making the same, and more particularly to read sensors having narrow track widths and high magnetoresistive sensitivities, and methods of making the same.

2. Description of the Related Art

Higher density recording needs of future direct access storage devices (DASDs) are forcing the dimensions of magnetic heads to be well into sub-micron sizes. For example, it is predicted that for 10 gigabit ($Gb/in^2$) drives, the read head size should be about 0.5 um; for 20 $Gb/in^2$ drives, the read head size should be about 0.35 um; for 40 $Gb/in^2$ drives, the read head size should be about 0.17 um; and for 100 $Gb/in^2$ drives, the read head size should be about 0.12 um. Such extreme resolutions make patterning techniques for the magnetic heads very difficult, especially for read sensors.

One conventional method of fabricating a magnetic head utilizes a common masking and milling process. A conventional lift-off mask is made of two layers, namely, a top photoresist layer and a bottom underlayer. This bi-layer lift-off mask is formed over the sensor materials in a central region. The lift-off mask may be referred to as a photoresist mask or resist mask. Ion milling is performed using the mask to remove sensor materials in end regions which surround the central region, such that a central read sensor below the resist mask is formed. Bias layers and lead layers are then deposited in the end regions and over the mask, and the resist mask is removed by dissolving the bottom underlayer. Finally, a gap layer is deposited over the read sensor and the surrounding lead layers. The above-described technique works very well in defining sensor structures down to 0.2 μm, but it shows limitations below that size.

A lead overlay structure is particularly advantageous for enhancing the performance of a read sensor and providing it with a narrow magnetic track width. A process for forming such a structure involves a first photolithography step to define the leads, and a second photolithography step plus ion milling to define the hard bias stabilization of the free layer in the read sensor at a set distance removed from the inner lead edge. However, performing two photolithography steps to define the read sensor is relatively difficult from a manufacturing point of view.

Accordingly, what are needed are improved read sensors having narrow track widths and improved methods of making the same.

SUMMARY OF THE INVENTION

A narrow track read sensor having a high magnetoresistive sensitivity is made using a self-alignment process which requires the use of only a single resist mask. A plurality of sensor layers which includes a top layer of noble metal is deposited over a substrate. A protective barrier layer, which may be conductive or reactive-ion-etchable, is then deposited over the sensor layers. After forming a resist mask in the central region, first lead layers are deposited in the end regions and over the resist mask. Ion milling is then performed such that the first lead layers and sensor layers in the end regions are substantially removed but sensor layers in the central region remain, to thereby form a read sensor having lead overlays on the edges thereof. Hard bias and second lead layers are then deposited in the end regions and over the resist mask.

After the resist mask is removed, the top of the read sensor is oxidized through an exposure to oxygen plasma such that the magnetoresistive sensitivity of the read sensor is increased or unchanged. Alternatively, the top layers of the read sensor are removed or transformed by reactive ion etching (RIE). Removal of the resist mask may be performed by chemical-mechanical polishing (CMP), where a carbon layer (e.g. diamond-like carbon or DLC) is deposited after the second lead layers.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
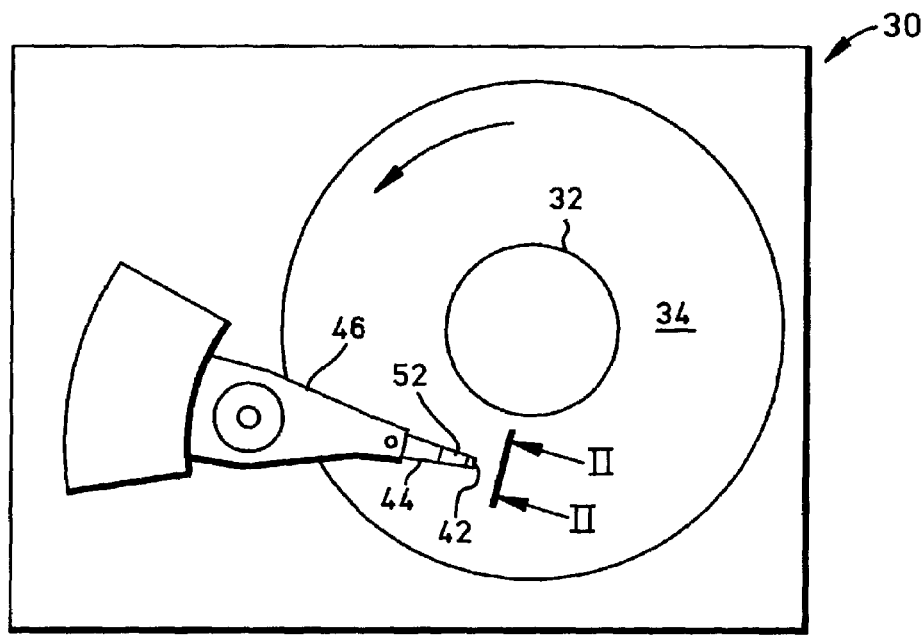
FIG. 1 is a planar view of an exemplary magnetic disk drive.
Figure 2:
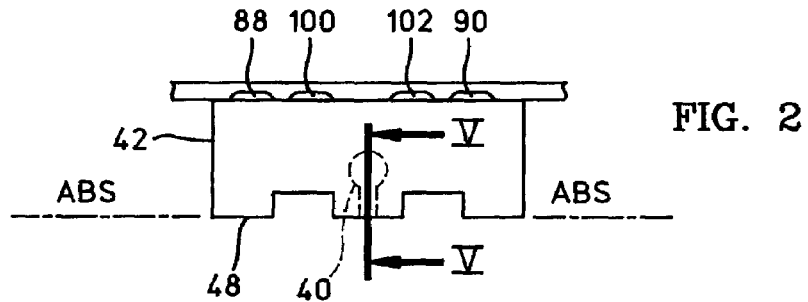
FIG. 2 is an end view of a slider with a magnetic head of the disk drive as seen in plane II—II of FIG. 1.
Figure 3:
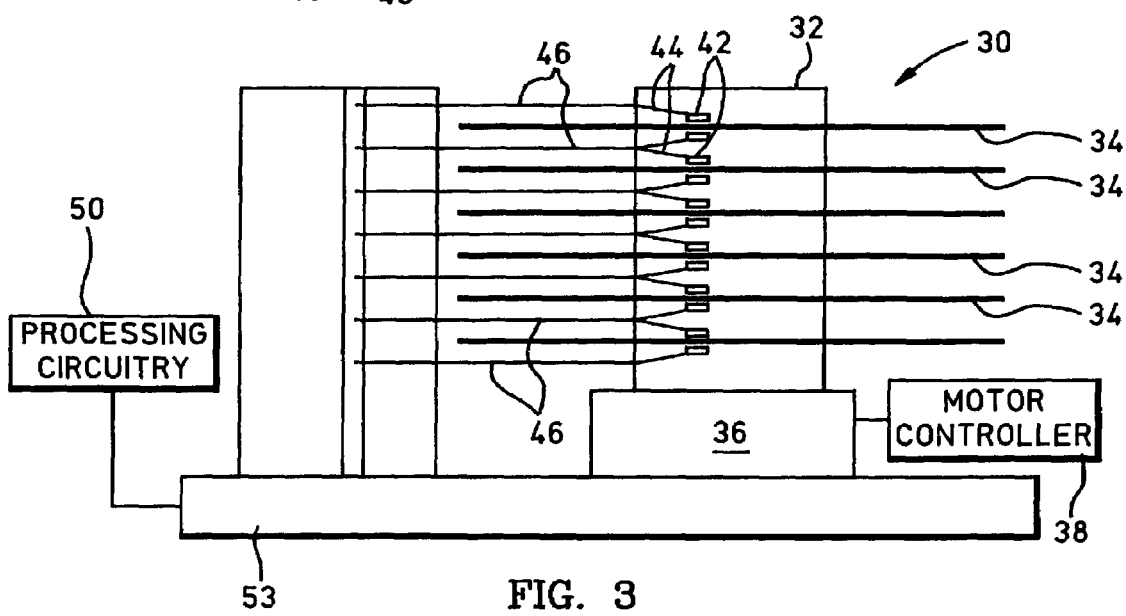
FIG. 3 is an elevational view of the magnetic disk drive wherein multiple disks and magnetic heads are employed.

Referring now to the drawings, wherein like reference numerals designate like or similar parts throughout the several views, as is illustrated in FIGS. 1–3 a magnetic disk drive 30 will now be described as it relates to the preferred embodiment of this work. Disk drive 30 is one type of magnetic recording device which may embody the present invention. Disk drive 30 includes a spindle there that supports and rotates a magnetic disk 34. Spindle 32 is rotated by a motor 36 that, in turn, is controlled by a motor controller 38. A horizontal combined magnetic head 40 for reading and recording is mounted on a slider 42. Slider 42 is supported by a suspension 44 and actuator arm 46. A plurality of disks, sliders and suspensions may be employed in a large capacity direct access storage device (DASD), as shown in FIG. 3. Suspension 44 and actuator arm 46 position slider 42 to locate magnetic head 40 in a transducing relationship with a surface of magnetic disk 34. When disk 34 is rotated by motor 36, slider 42 is supported on a thin (typically, 0.02 micrometer) cushion of air (or air bearing) between disk 34 and an air bearing surface (ABS) 48.

Figure 4:
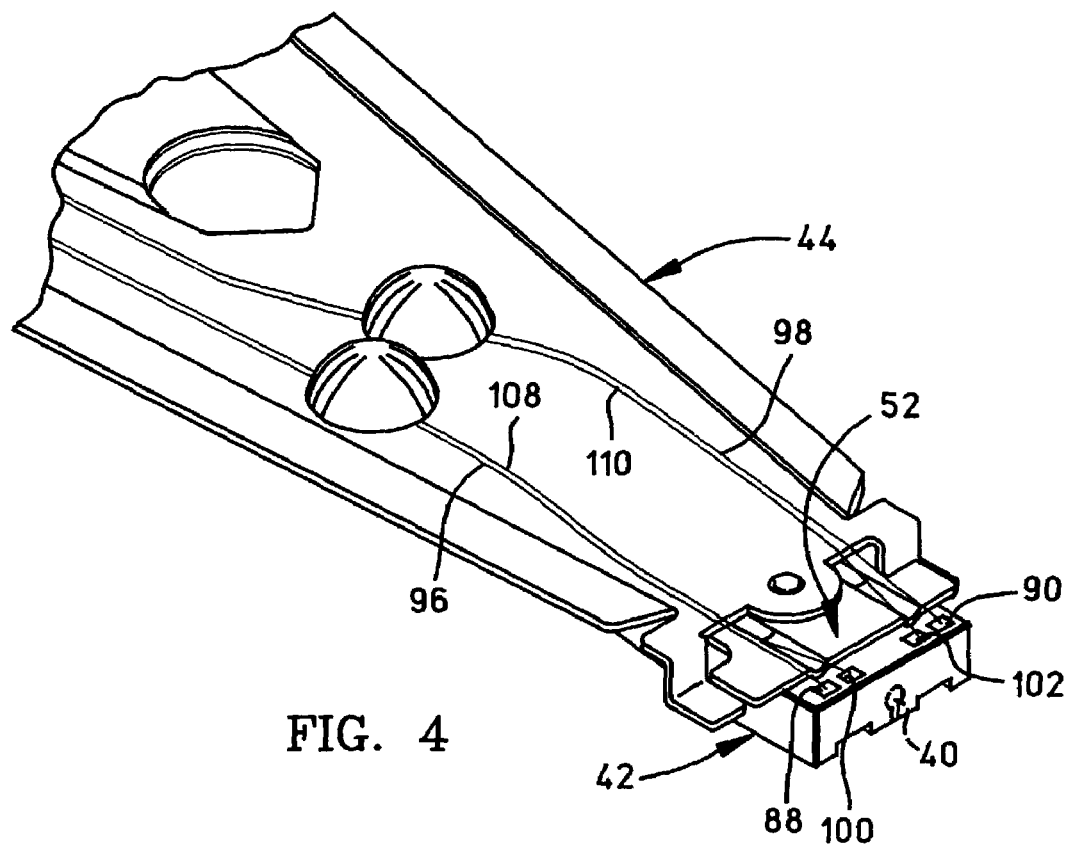
FIG. 4 is an isometric illustration of an exemplary suspension system for supporting the slider and magnetic head.

Magnetic head 40 may be employed for writing information to multiple circular tracks on the surface of disk 34, as well as for reading information therefrom. Processing circuitry 50 exchanges signals representing such information with magnetic head 40, provides motor drive signals, and also provides control signals for moving slider 42 to various tracks. In FIGS. 1 and 4, slider 42 is shown mounted to a head gimbal assembly (HGA) 52 that is mounted to suspension 44. All of the above components are supported on a base 53.

Figures 5, 7:
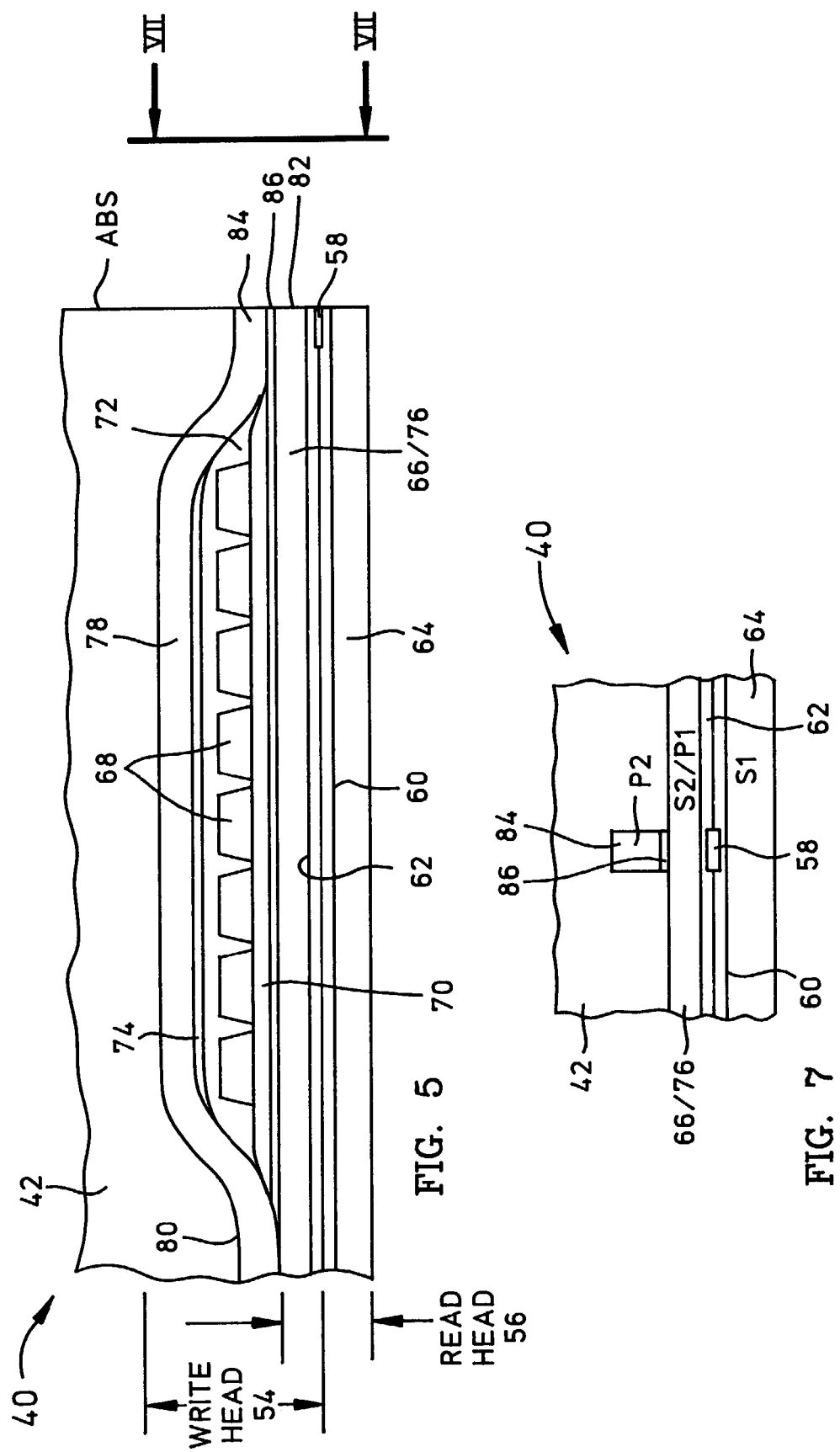
FIG. 5 is a partial elevation view of the slider and magnetic head as seen in plane V—V of FIG. 2.
FIG. 7 is a partial ABS view of the slider taken along plane VII—VII of FIG. 5 to show the read and write elements of the magnetic head.

FIG. 5 is a side cross-sectional elevation view of a merged read/write head 40 which has a write head portion 54 and a read head portion 56. Note also the partial ABS view of head 40 in FIG. 7. Read head portion includes a giant magnetoresistive read (GMR) sensor 58. GMR sensor 58 is sandwiched between first and second gap layers 60 and 62 that are, in turn, sandwiched between first and second shield layers 64 and 66. In response to external magnetic fields, the resistance of GMR sensor 58 changes. A sense current conducted through the sensor causes these resistance changes to be manifested as potential changes, which are processed by processing circuitry 50 (FIG. 3).

Figure 6:
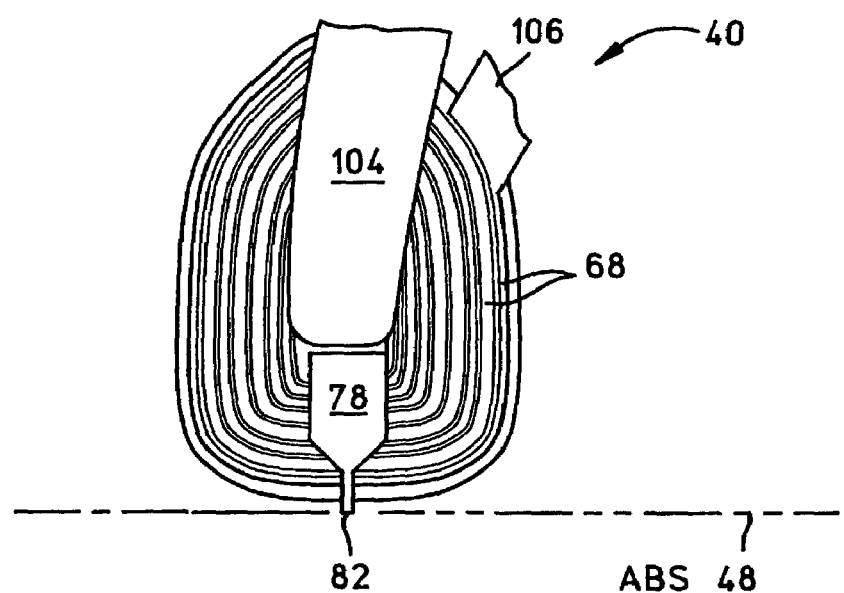
FIG. 6 is a top view of the second pole piece and coil layer, a portion of which is shown in FIG. 5, with all insulation material removed.

Write head portion 54 of the head includes a coil layer 68 sandwiched between first and second insulation layers 70 and 72. A third insulation layer 74 may be employed for planarizing the head to eliminate ripples in the second insulation layer caused by coil layer 68. The first, second and third insulation layers are referred to as an "insulation stack". Coil layer 68, and first, second and third insulation layers 70, 72 and 74, are sandwiched between first and second pole piece layers 76 and 78. The first and second pole piece layers 76 and 78 are magnetically coupled at a back gap 80, and have first and second pole tips 82 and 84 that are separated by a non-magnetic gap layer 86 at the ABS. As shown in FIGS. 2 and 4, first and second solder connections 88 and 90 connect leads (not shown) from GMR sensor 58 to leads 96 and 98 on suspension 44; third and fourth solder connections 100 and 102 connect leads 104 and 106 from coil 68 (see FIG. 6) to leads 108 and 110 on the suspension.

An inventive method of making a magnetic head will now be described in relation to FIGS. 8–24. More particularly, the method relates to making magnetic head 40 and GMR sensor 58 described in relation to FIGS. 1–7. Reference will now be made to the flowchart of FIG. 8 in combination with the head formation illustrations in FIGS. 9–24. The method begins with the structure shown in FIG. 9, where a first gap layer 902 is formed on a shield layer 900 which is located over a substrate (step 802 of FIG. 8). Shield layer 900 may be made of any suitable soft magnetic material, such as Permalloy. First gap layer 902 may be made of any suitable insulating material, such as alumina.

Figure 8:
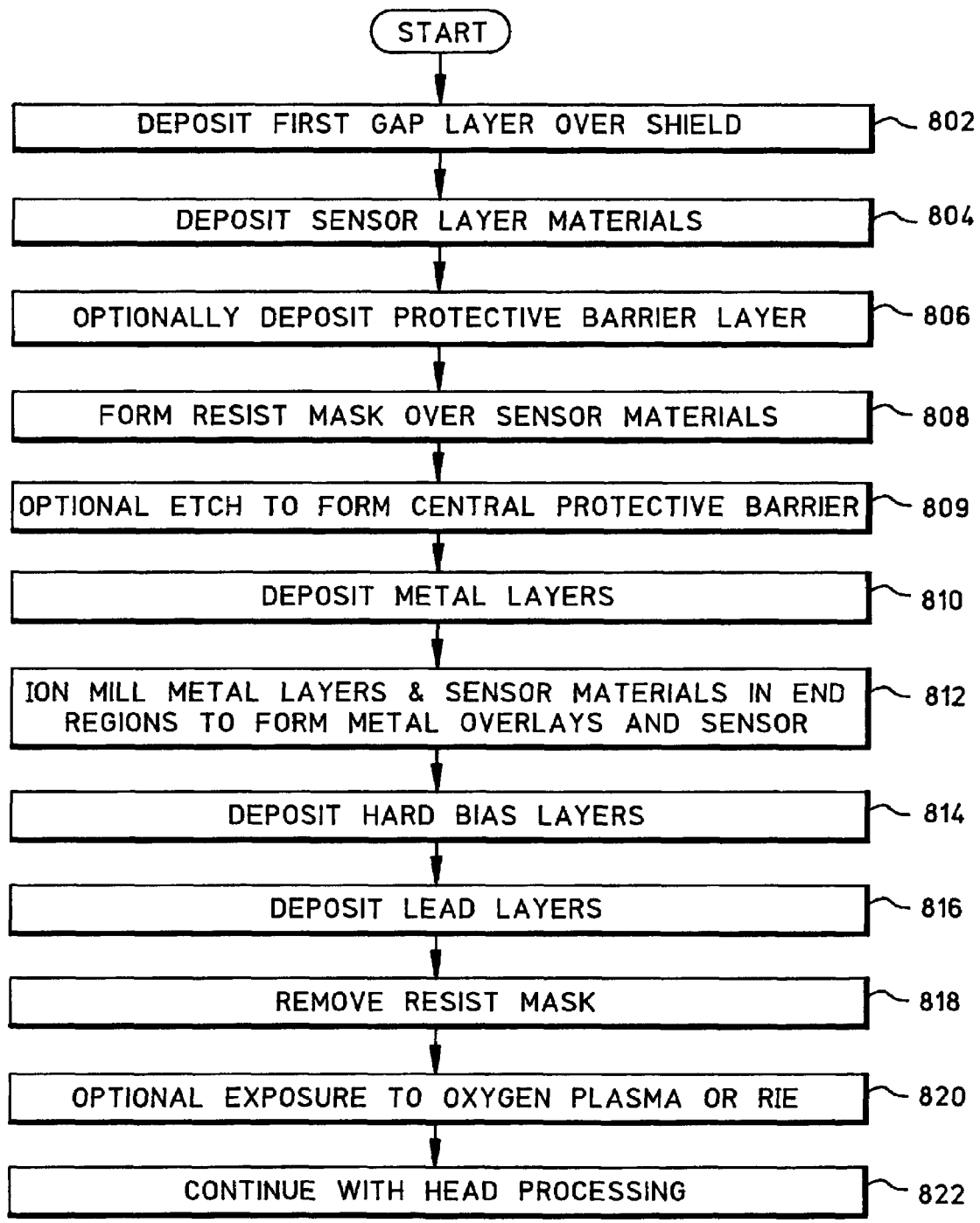
FIG. 8 is a flowchart describing a method of making a magnetic head in accordance with the present invention.
Figure 9:
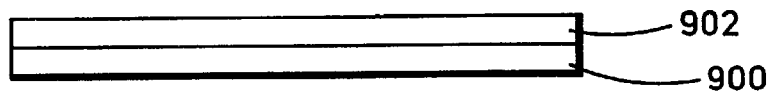
FIG. 9 is the first of a series of cross-sectional views of FIGS. 9–17 which relate to a method of making a magnetic head, which in FIG. 9 shows a first gap layer formed over a shield layer.
Figure 10:
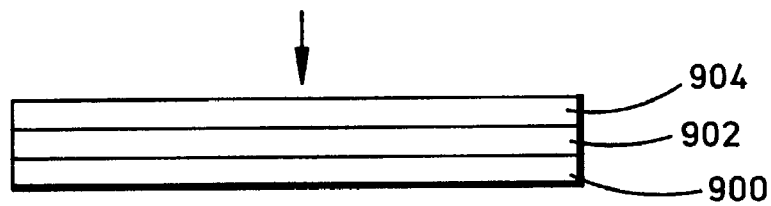
FIG. 10 is the same as that shown in FIG. 9, except that sensor layer materials are formed over the first gap layer.

In FIG. 10, sensor layer materials 904 are deposited over first gap layer 902 (step 804 of FIG. 8). GMR sensor materials 904 may include several common materials, such as nickel-iron and cobalt-iron. Sensor layer materials 904 also include a top noble metal layer, made from material such as a gold alloy, a mercury alloy, platinum, palladium, iridium, rhodium, ruthenium, osmium, or combinations thereof. Preferably, the total thickness of sensor layers 904 is between about 100–400 Angstroms and the top noble metal layer is about 3 nanometers (nm).

Optionally, sensor layer materials 904 may be capped with removable material. To illustrate, in FIG. 11 a capping layer 908 is deposited on top of sensor materials 904 (step 806 of FIG. 8) in order to later prevent the removal of portions of the read sensor. The protective barrier layer 908 in FIG. 11 may be a conductive layer or a reactive-ion-etchable (RIEable) layer. If layer 908 is a conductive layer, it is preferably made from ruthenium (Ru) or ruthenium-oxide (RuOx). If layer 908 is a RIEable layer, it is preferably made from tantalum (Ta), tantalum-oxide (TaOx), or carbon (C) such as diamond-like carbon (DLC). By RIEable, it is meant that the layer is removable by a RIE process. Layer 908 may be referred to as a "protective barrier" or "resistive barrier" layer.

Figure 12:
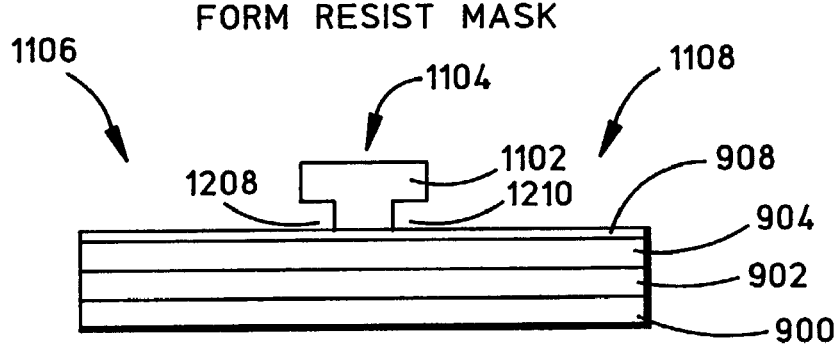
FIG. 12 is the same as that shown in FIG. 11, except that a resist mask is formed in the central region.
Figure 20:
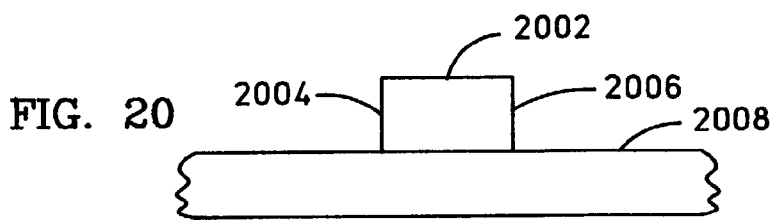
FIG. 20 is a cross-sectional illustration of a photoresist-only mask which is formed over the structure.
Figure 21:
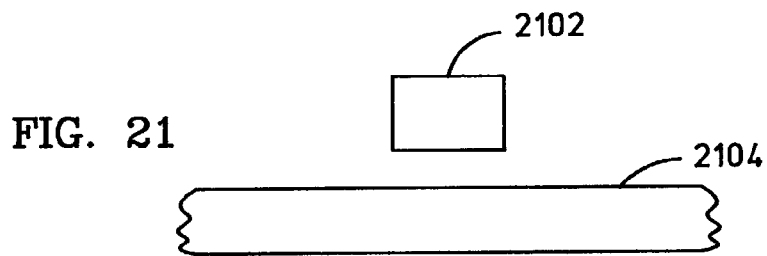
FIG. 21 is a cross-sectional illustration of a bridged photoresist-only mask which is formed over the structure.
Figure 22:
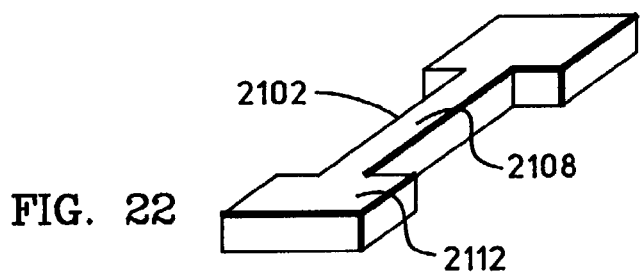
FIG. 22 is an isometric view of the bridged photoresist-only mask of FIG. 21.

In FIG. 12, a resist mask 1102 is then formed over sensor layer materials 904 in a central region 1104 (step 808 of FIG. 8). Central region 1104 is surrounded by end regions 1106 and 1108. Resist mask 1102 may be a conventional resist mask which is formed using well-known deposition and etching techniques. The resist mask may be, for example, a bi-layer lift-off mask having a top photoresist layer and a bottom underlayer. For a description of this lift-off mask and others, see U.S. Pat. No. 6,218,056B1 which is hereby incorporated by reference herein. Alternatively, resist mask 1102 may be a photoresist-only mask or a bridged photoresist-only mask. Referring ahead to FIG. 20, a photoresist-only mask 2002 is illustrated. As shown, photoresist-only mask 2002 is not formed with undercuts but has sideswalls 2004 and 2006 which are somewhat vertical and extend all the way down onto the structure 2008. If photoresist-only mask 2002 is utilized, it may have to be removed through a chemical-mechanical polishing (CMP) process (described later below). In FIG. 21 a bridged photoresist mask 2102 is shown suspended over structure 2104, and in FIG. 22 this bridged photoresist mask 2102 is shown in an isometric view. As illustrated, a device region 2108 of mask 2102 is completely undercut, but non-device regions 2112 that support the bridge are not undercut.

Figure 13:
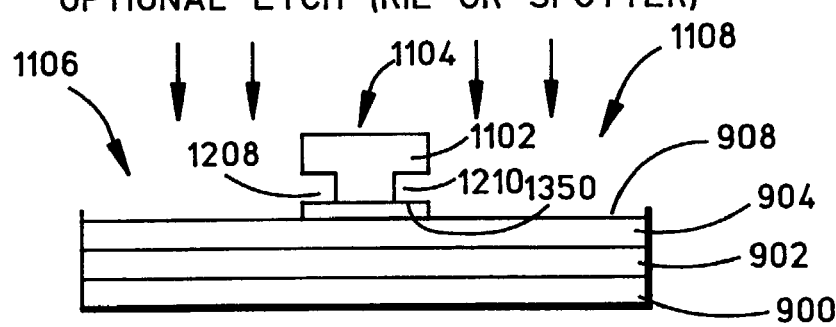
FIG. 13 is the same as that shown in FIG. 12, except that an etch (RIE or sputter etch) is performed to remove any protective barrier layer in the end regions.

Continuing the method in relation to FIG. 13, if a protective barrier layer was deposited in step 806 then etching is performed to remove portions of the protective barrier layer in end regions 1106 and 1108 to form a central protective barrier 1350 (step 809 of FIG. 8). If the protective barrier layer was a RIEable layer, then the etch is RIE using a fluorine-containing gas. If the protective barrier layer was DLC, the read sensor will need the top noble metal cap since a later oxygen plasma exposure to remove the carbon layer in the field would otherwise oxidize the layer beneath the DLC.

Figure 14:
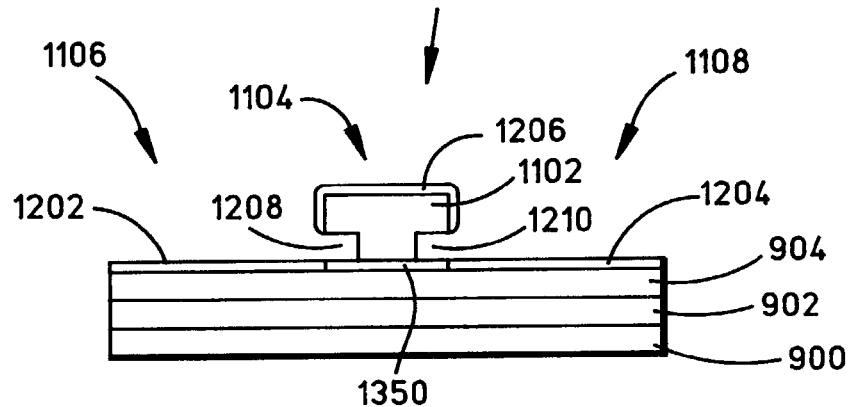
FIG. 14 is the same as that shown in FIG. 13, except that lead layers are deposited in the end regions.
Figure 15:
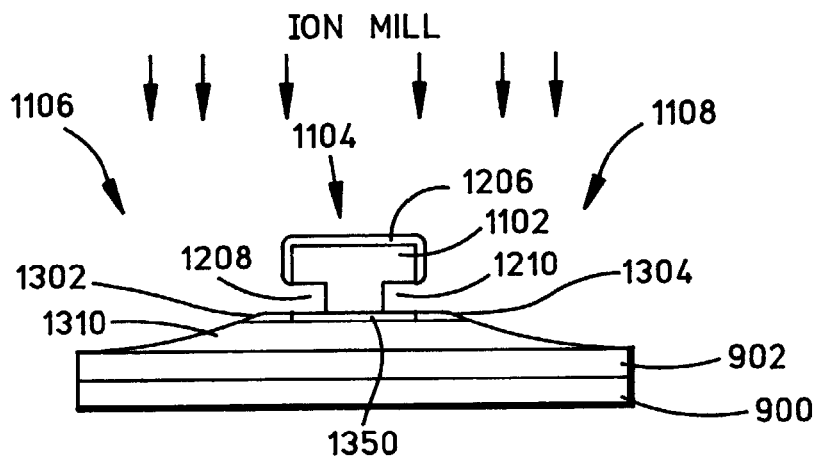
FIG. 15 is the same as that shown in FIG. 14, except that ion milling was performed to form a read sensor in the central region.

Next, in FIG. 14, lead layers 1202 and 1204 are deposited in end regions 1106 and 1108 over sensor materials 904 (step 810 of FIG. 8). Lead material 1206 is also formed over the top of resist mask 1102. Lead layers 1202 and 1204 may be made of any suitable conductive material, such as gold, tungsten, rhodium, ruthenium, palladium, tantalum, or combinations thereof. Preferably, each lead layer 1202 and 1204 is deposited to a thickness of between 50 and 250 Angstroms. Lead layers 1202 and 1204 will eventually be formed into what is referred to as a lead overlay structure or lead overlays. The lead layers and lead overlays may be referred to as metal layers and metal overlays, respectively, or as conductive layers or conductive overlays, respectively. These lead layers or overlays may be made from a magnetic material that either kills the moment of the sensor (e.g., chromium diffusion into nickel-iron) or cancels the moment by containing a magnetic layer of similar thickness as the free layer of the sensor. This will define the magnetic track width and may reduce side writing depending on the read gap spacing between the magnetic shields.

Next, ion milling is performed such that sensor materials 904 in end regions 1106 and 1108 are removed and a read sensor 1310 shown in FIG. 14 is formed in central region 1104 (step 812 of FIG. 8). In addition, most of lead layers 1202 and 1204 (FIG. 14) are removed in end regions 1106 and 1108 by this process, but lead portions 1302 and 1304 (i.e. lead overlays) shown in FIG. 15 remain over the edges of read sensor 1310. These lead overlay portions make ohmic contact with the edges of the sensor to define a magnetic track width (TW) for read sensor 1310. There may also be a windage or known difference between the overlay separation and the magnetic track width for read sensor 1310. Due to the deposition of lead layers 1202 and 1204 in FIG. 14, which increases the thickness and width of resist mask 1102, the areas in which sensor materials are milled by this step (for subsequent hard bias deposition) are pushed slightly outwards and away from central region 1104 and read sensor 1310. The final thickness of lead portions 1302 and 1304 is slightly less than the thickness of the lead material that was initially deposited due to the milling that removed materials in end regions 1106 and 1108.

Figure 16:
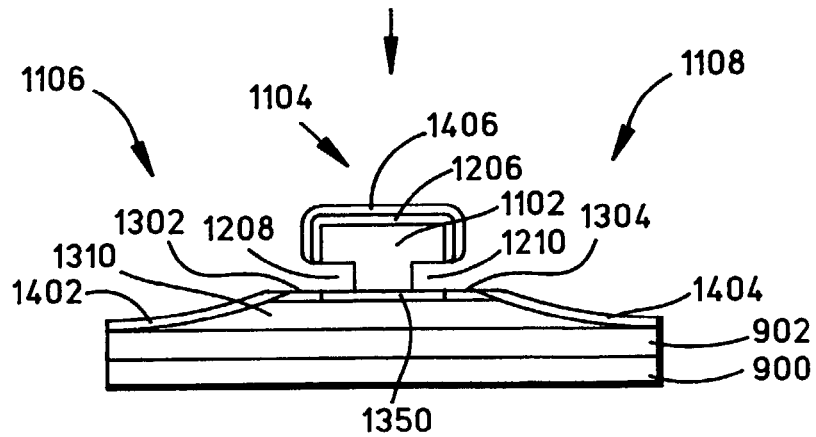
FIG. 16 is the same as that shown in FIG. 15, except that bias layers are deposited in the end regions.

In FIG. 16, hard bias layers 1402 and 1404 are deposited in end regions 1106 and 1108, respectively (step 814 of FIG. 8). Bias material 1406 is also formed on the top of lead material 1206 over resist mask 1102. Hard bias layers 1402 and 1404 may be made of any suitable magnetic material, such as cobalt-platinum-chromium. Preferably, hard bias layers 1402 and 1404 are deposited to a thickness of between 100–300 Angstroms. Due to the deposition of lead layers 1202 and 1204 in FIG. 14, which increases the thickness and width of resist mask 1102, the areas in which hard bias layers 1402 and 1404 are deposited in this step are pushed slightly outwards and away from central region 1104 and read sensor 1310.

It is noted that the thickness of lead layers 1202 and 1204 deposited in FIG. 14 is limited by both the ability to remove resist mask 1102 in a subsequent process and the amount of separation of offset of hard bias 1402 and 1404 (FIG. 16) from the lead overlays 1302 and 1304. The thickness of lead layers 1202 and 1204 (FIG. 14) is related and roughly equivalent to the offset of hard bias 1402 and 1404 (FIG. 16) from the leads.

Figure 17:
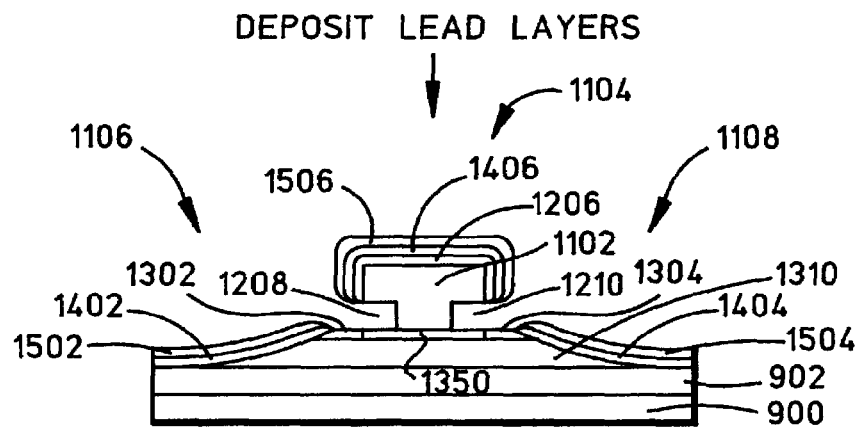
FIG. 17 is the same as that shown in FIG. 16, except that additional lead layers are deposited in the end regions.

In FIG. 17, another set of lead layers 1502 and 1504 are then deposited over hard bias layers 1402 and 1404, respectively (step 816 of FIG. 8). Lead material 1506 is also formed over the top of resist mask 1102. Lead layers 1502 and 1504 may be made of any suitable conductive material, such as gold, tungsten, rhodium, ruthenium, palladium, tantalum, or combinations thereof. It is noted that materials utilized for lead layers 1502 and 1504 and hard bias layers 1402 and 1404 may be different from those utilized for lead overlays 1302 and 1304. Lead layers 1502 and 1504 may be deposited to a thickness between about 50 and 950 Angstroms. Hard bias layers 1402 and 1404 and lead layers 1502 and 1504 may be deposited in-situ.

Figure 18:
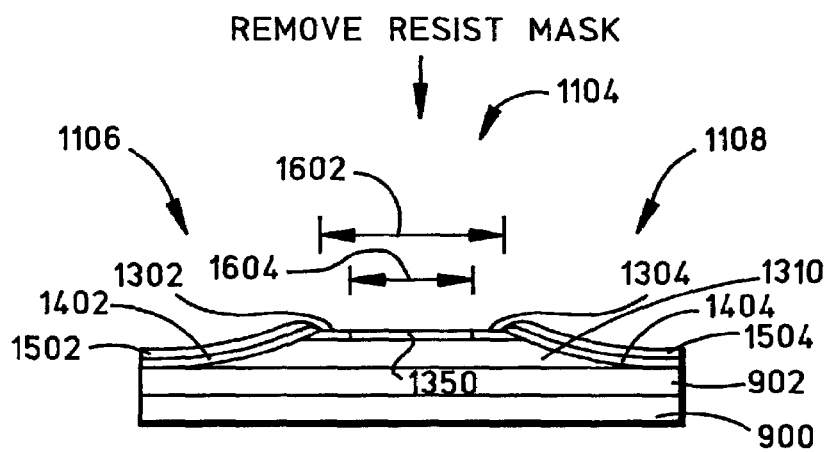
FIG. 18 is the same as that shown in FIG. 17, except that the resist mask is removed.

Resist mask 1102 is then removed (step 818 of FIG. 8), and the resulting structure is shown in FIG. 18. Any suitable method may be utilized to remove the resist mask, such as using a conventional stripper solution to dissolve the underlayer of resist mask 1102 (FIG. 17). The edges of lead overlays 1302 and 1304 of FIG. 18 help define a magnetic track width 1604 for read sensor 1310. Magnetic track width 1604 may be defined to be between 0.04 $\mu$m and 0.20 $\mu$m. To compare, a physical or mechanical track width 1602 of read sensor 1310 may be between 0.02 $\mu$m and 0.15 $\mu$m. A portion of the thin top noble metal layer on read sensor 908 is exposed on the surface. Portions of the noble metal layers, however, still remain underneath lead overlays 1302 and 1304.

Figure 11:
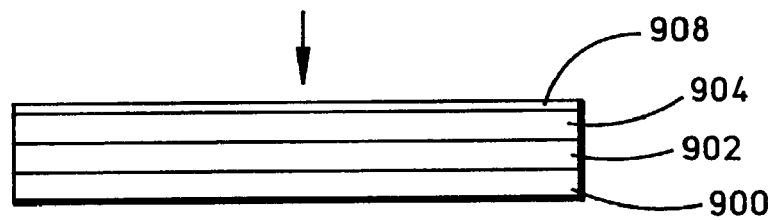
FIG. 11 is the same as that shown in FIG. 10, except that a protective barrier layer is optionally formed over the sensor layer materials.
Figure 23:
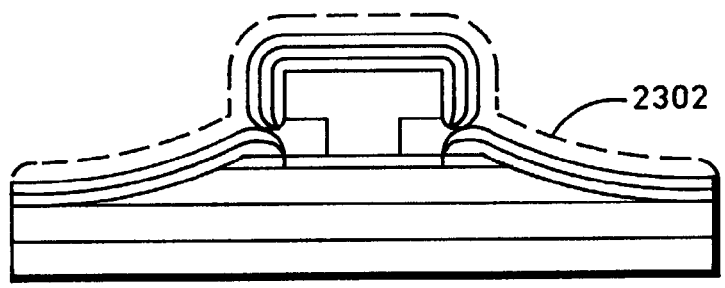
FIG. 23 is the same as that shown in FIG. 17 except that a chemical-mechanical polishing (CMP)-resistant material is deposited over the structure.

Preferably, the resist mask is removed in step 818 by chemical-mechanical polishing (CMP) which shears the mask off the wafer. This may be necessary since, as shown in FIG. 17, multiple layers of bias 1402, 1404, and 1406 and leads 1502, 1504, 1506 cover resist mask 1102 which may make it difficult to remove from central region 1104. If this removal procedure is to be performed, protective barrier layer 908 of FIG. 11 is a CMP-resistant layer (e.g. DLC) which is deposited and formed in central region 1104. This CMP-resistant material helps prevent mechanical dishing into the sensor when the resist is removed. If the resist is being removed by CMP, another CMP-resistant layer should also be deposited over the structure of FIG. 17 just after the second set of lead layers are deposited (preferably in-situ). In FIG. 23, such an additional layer of CMP-resistant material 2302 is shown formed over the structure, where the deposition of lead or bias material would make resist 1102 lift-off difficult This layer will prevent the removal of the hard bias and lead layers during the CMP removal of the resist. The CMP-resistant layers may be made from any suitable material that is resistant to CMP, such as carbon or, more particularly, diamond-like carbon (DLC). As an example, a layer of DLC may be deposited to a thickness between about 40–200 Angstroms.

Figure 19:
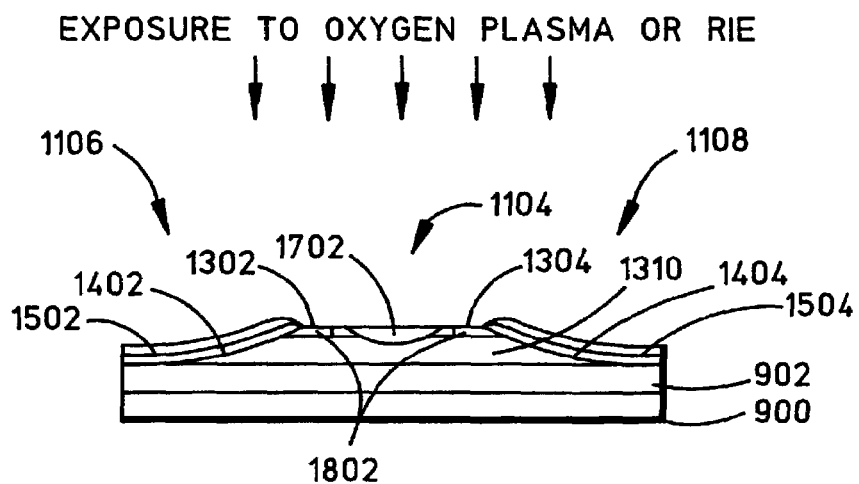
FIG. 19 is the same as that shown in FIG. 18, except that the top of the read sensor is exposed to an oxygen plasma or reactive ion etch (RIE)

Optionally, in FIG. 19, the top underlying sensor layers are exposed to an oxygen plasma to form oxidized sensor layers 1702 (step 820 of FIG. 8). Advantageously, this increases the sensitivity of read sensor 1310 (at least in part) by increasing the current density through the free layer of read sensor 1310. The oxygen plasma may contain oxygen or carbon dioxide ($CO_2$) that is exposed to a wafer that may be electrically biased. This exposure may last between 1–60 seconds. The top layers of read sensor 1310 may be oxidized to a depth of between 10 and 50 Angstroms. If read sensor 1310 is exposed to the oxygen plasma, the ion energies of the oxygen plasma may be used to sputter the top noble metal layer of read sensor 908. Also, the oxygen plasma exposure may be used to remove the central portion of any CMP-resistant layer of carbon (e.g. DLC) formed over read sensor 908.

Figure 24:
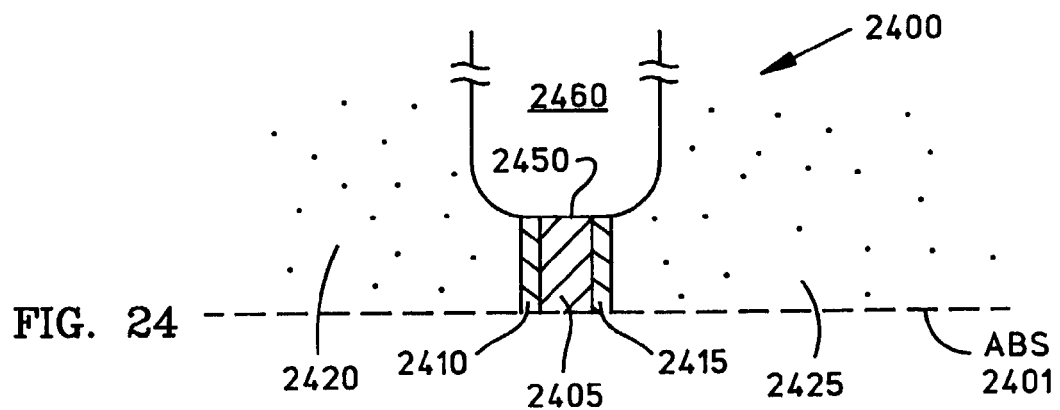
FIG. 24 is a top down view of a read sensor portion of the magnetic head.

Referring now to FIG. 24, a top down view of a resulting read sensor 2400 is shown. A sensor region 2405 is surrounded by lead and hard bias materials 2420 and 2425, as well as insulator materials 2460 which are deposited coplanar with read sensor 2400. Areas 2410 and 2415 are the edges of overlap between the first metal and sensor region 2405. A back sensor edge 2450 defines the stripe height (SH) for read sensor 2400. The preferred shape of read sensor 2400 is defined by the head fabrication of an ABS 2401.

In an alternative process for step 820 of FIG. 8, the top underlying sensor layers are not oxidized but rather removed by a RIE process to form a removed sensor layer region 1702 (FIG. 19). The RIE may be performed using any suitable etch gas, such as one containing fluorine (e.g., $CHF_3$, $C_3F_8$, or $CF_4$), and may last for anywhere between about 1–60 seconds. The depth of removal of the top sensor layers 1310 may be between about 10–50 Angstroms. The removal or oxidization of the top sensor layers only at the sensor location improves spin-dependent scattering and/or current flux through the free layer (i.e. providing a higher current density). After this step is performed, remaining portions 1802 of the protective barrier exist underneath lead overlays 1302 and 1304.

The method may continue with additional head processing (step 822 of FIG. 8), conventional or otherwise, to complete the making of the magnetic head. For example, a second gap layer may be subsequently formed over the structure of FIG. 18. This second gap layer may be made of any suitable insulating material, such as alumina.

Thus, a narrow track width read sensor having a high magnetoresistive sensitivity is made using a self-aligned process which requires the use of only a single resist mask. A plurality of sensor layers which includes a top layer of noble metal is deposited over a substrate. A protective barrier layer, which may be conductive or reactive-ion-etchable, may be deposited over these sensor layers. After forming a resist mask in the central region, first lead layers are deposited in the end regions and over the resist mask. Using the resist mask, ion milling is performed such that the first lead layers and sensor layers in the end regions are removed, but sensor layers in the central region remain to thereby form a read sensor having lead overlays on the edges thereof. Hard bias and second lead layers are then deposited in the end regions and over the resist mask. After the resist mask is removed, the top of the read sensor may be oxidized through an exposure to oxygen plasma such that the magnetoresistive sensitivity of the read sensor is increased. Alternatively, the top layers of the read sensor may be removed or transformed by reactive ion etching (RIE). Removal of the resist mask may be performed by chemical-mechanical polishing (CMP), where a carbon layer (e.g. diamond-like carbon or DLC) is deposited after the second lead layer deposition.

It is to be understood that the above is merely a description of preferred embodiments of the invention and that various changes, alterations, and variations may be made without departing from the true spirit and scope of the invention as set for in the appended claims. None of the terms or phrases in the specification and claims has been given any special particular meaning different from the plain language meaning to those skilled in the art, and therefore the specification is not to be used to define terms in an unduly narrow sense.

What is claimed is:

1. A method of making a magnetic head, comprising:
   depositing a plurality of sensor layers over a substrate;
   depositing a protective barrier layer over the plurality of sensor layers;
   forming a resist mask in a central region which is disposed between end regions;
   etching, with use of the resist mask, such that the protective barrier layer in the end regions are removed to thereby form a central protective barrier in the central region;
   depositing first lead layers in the end regions and over the resist mask in the central region;
   milling, with use of the resist mask, such that first lead layer materials and sensor layer materials in the end regions are substantially removed, but the sensor layers in the central region remain to thereby form a read sensor having lead overlays over edges thereof;
   depositing hard bias layers in the end region and over the resist mask in the central region;
   depositing second lead layers in the end regions and over the resist mask in the central region; and
   removing the resist mask from the central region.

2. The method of claim 1, wherein the resist mask comprises a lift-off mask.

3. The method of claim 1, wherein the resist mask comprises a bridged photoresist mask.

4. The method of claim 1, further comprising: after removing the resist mask, oxidizing a top of the read sensor.

5. The method of claim 1, further comprising: after removing the resist mask, oxidizing a top of the read sensor by an exposure to oxygen plasma.

6. The method of claim 1, further comprising:
   after removing the resist mask, oxidizing a top of the read sensor such that a magnetoresistive sensitivity of the read sensor is increased.

7. The method of claim 1, wherein the plurality of sensor materials comprises a top layer of noble metal, and the method further comprises the act of:
   after removing the resist mask, exposing the top of the read sensor to an oxygen plasma to transform the top layer of noble metal to an oxide.

8. The method of claim 1, further comprising:
   after removing the resist mask, reactive ion etching (RIE) a top layer of the read sensor for removal.

9. The method of claim 1, wherein the protective barrier layer comprises one of a conductive layer, a reactive-ion-etchable layer, and a conductive and reactive-ion-etchable layer.

10. The method of claim 1, further comprising:
    prior to forming the resist mask, forming a carbon layer over the protective barrier layer.

11. The method of claim 1, further comprising:
    prior to forming the resist mask, forming a carbon layer over the protective barrier layer; and
    wherein the carbon layer comprises diamond-like carbon (DLC).

12. The method of claim 1, further comprising:
    prior to forming the resist mask, forming a carbon layer over the protective barrier layer; and wherein the act of removing the resist mask comprises the act of chemical-mechanical polishing (CMP) such that the resist mask is sheared off of the central region.

13. A method of making a magnetic head, comprising:
depositing a plurality of sensor layers over a substrate, wherein the sensor layers include a top noble metal layer;
forming a resist mask in a central region which disposed between end regions;
depositing first lead layers in the end regions and over the resist mask in the central region;
milling, with use of the resist mask, such that first lead layer materials and sensor layer materials in the end regions are substantially removed, but the sensor layers in the central region remain to thereby form a read sensor having lead overlays over edges thereof;
depositing hard bias layers in the end region and over the resist mask in the central region;
depositing second lead layers in the end regions and over the resist mask in the central region; and
removing the resist mask from the central region.

14. The method of claim 13, further comprising:
prior to forming the resist mask, depositing a protective barrier layer over the plurality of sensor layers.

15. The method of claim 13, further comprising:
prior to forming the resist mask, depositing a protective barrier layer over the plurality of sensor layers;
wherein the protective barrier layer comprises a reactive-ion-etchable material; and
after forming the resist mask, reactive ion etching (RIE) to remove the protective barrier layer in the end regions to form a central protective barrier.

16. The method of claim 13, further comprising:
prior to forming the resist mask, depositing a protective barrier layer over the plurality of sensor layers;
wherein the protective barrier layer comprises a reactive-ion-etchable oxide material; and
after forming the resist mask, sputter etching to remove the protective barrier layer in the end regions to form a central protective barrier.

17. The method of claim 13, wherein the act of removing the resist mask comprises dissolving the resist mask with a solvent.

18. The method of claim 13, wherein the act of removing the resist mask comprises:
chemically-mechanically polishing (CMP) to shear the resist mask from the central region.

19. The method of claim 13, wherein the resist mask comprises a photoresist mask having straight sidewalls, and the act of removing the resist mask comprises:
chemically-mechanically polishing (CMP) to shear the resist mask from the central region.

20. The method of claim 13, wherein a central protective barrier over the sensor layers in the central region comprises a chemical-mechanical-polish-resistant material, and the act of removing the resist mask comprises:
chemical mechanical polishing (CMP) to shear the resist mask from the central region.

21. The method of claim 13, wherein the act of removing the resist mask comprises chemical mechanical polishing (CMP) to shear the resist mask from the central region, the method further comprising:
after depositing the second lead layers, depositing a chemical-mechanical-polish-resistant material in the end regions and central region.

22. The method of claim 13, further comprising:
prior to forming the resist mask, forming a central protective barrier over the sensor layers in the central region, the central protective barrier comprising a chemical-mechanical-polish-resistant material;
after depositing the second lead layers, depositing a chemical-mechanical-polish-resistant material in the end regions and central region; and
wherein the act of removing the resist mask comprises chemical mechanical polishing (CMP) to shear the resist mask from the central region.

23. The method of claim 13, further comprising:
prior to forming the resist mask, forming a central protective barrier over the sensor layers in the central region, the central protective barrier comprising a chemical-mechanical-polish-resistant material;
after depositing the second lead layers, depositing a chemical-mechanical-polish-resistant material in the end regions and central region;
wherein the act of removing the resist mask comprises chemical mechanical polishing (CMP) to shear the resist mask from the central region; and
wherein the chemical-mechanical-polish resistant material comprises diamond-like-carbon (DLC).

24. The method of claim 13, wherein the resist mask comprises a bridged photoresist mask.

25. The method of claim 13, wherein the lead overlays comprise a magnetic material.

26. The method of claim 13, wherein the lead overlays comprise a magnetic material which eliminates a magnetic moment of the read sensor.

27. The method of claim 13, wherein the lead overlays comprise a magnetic material having a thickness that is substantially the same as a thickness of a free layer of the read sensor to thereby cancel a magnetic moment of the read sensor.

28. The method of claim 13, further comprising:
prior to forming the resist mask, depositing a protective barrier layer over the plurality of sensor layers; and
after removing the resist mask, oxidizing a top of the read sensor by an exposure to oxygen plasma.

29. The method of claim 13, further comprising:
prior to forming the resist mask, depositing a protective barrier layer over the plurality of sensor layers; and
after removing the resist mask, reactive ion etching (RIE) a top layer of the read sensor for removal.

* * * * *